United States Patent Office 2,794,005
Patented May 28, 1957

2,794,005

MOLYBDENUM OXIDE CATALYST PRODUCTION

Philip A. Lefrancois, Cranford, N. J., assignor to The M. W. Kellogg Company, Jersey City, N. J., a corporation of Delaware No Drawing. Application April 15, 1952,
Serial No. 282,452

6 Claims. (Cl. 252—465)

This application is related to Serial No. 282,453, filed April 15, 1952, now abandoned.

This invention relates to a novel catalyst containing molybdenum oxide and the method of preparing the same, and more particularly pertains to a novel molybdenum oxide supported on alumina catalyst and the method of making the same.

It is an object of this invention to provide an improved catalyst containing molybdenum oxide.

Another object of this invention is to provide an improved method for the preparation of a catalyst containing molybdenum oxide.

Still another object of this invention is to provide a molybdenum oxide on alumina catalyst which is especially adapted for hydrocarbon conversion reactions.

A further object of this invention is to provide a novel method for the preparation of a molybdenum oxide on alumina catalyst.

A still further object of this invention is to provide a novel molybdena-alumina catalyst and a novel method of making the same, which catalyst is especially adapted in reforming petroleum naphthas.

Other objects and advantages will become apparent from the following description and explanation thereof.

By means of the present invention, a superior catalyst is obtained by the method which comprises mixing a molybdenum oxide in the solid form with an alumina-containing substance and subjecting the mixture to an elevated temperature sufficient to transform the same into a catalyst comprising molybdenum oxide distributed on alumina.

The catalyst of the present invention is especially adapted for the catalysis of hydrocarbon conversion reactions, such as for example, cracking under hydrogen pressure, reforming, hydroforming, etc. As a result of the catalyst proposed hereunder, it is noted that the liquid yield of desired product is significantly greater than that obtained by the use of other molybdenum oxide type of catalysts prepared by known techniques. In addition to an increase in the liquid product yield, it is noted that the carbon or coke yield as well as the dry gas yield is less, thus indicating that the catalyst of this invention is more selective for the conversion of hydrocarbons. The selective nature of a catalyst is particularly important for reforming operations involving the conversion of a low octane naphtha to a gasoline product of high anti-knock quality. The reforming treatment is usually accompanied by the production of dry gas and coke, thus demonstrating that a portion of the naphtha feed is converted by cracking reactions to product materials of little or no value. The liquid product, dry gas and coke yields serve to indicate the selective quality of a catalyst. Accordingly, any catalyst which has the tendency to produce unusually high coke and gas yields is considered to possess a poor selectivity. On the other hand, those catalysts which produce unusually high liquid product yields and low carbon and dry gas yields are highly desirable and possess a high selectivity. The selectivity serves to indicate the ability of a catalyst to convert hydrocarbon to a desired product without substantial loss of the feed material to undesired by-products.

The reforming operation can be conducted under net hydrogen producing conditions, viz., hydroforming or under conditions of net hydrogen consumption. Generally, a temperature in the order of about 800° to about 1075° F., preferably about 850° to about 975° F., is employed in the reaction. The pressure is varied to produce the desired conditions of severity, and generally, it can vary from about 50 to about 1000 p. s. i. g., preferably from about 100 to about 500 p. s. i. g. The severity of operation is also controlled by regulation of the space velocity, which is measured as the pounds of oil feed per hour which is charged to a reactor per pound of catalyst present therein. The space velocity generally used varies from about 0.05 to about 10 at the temperature and pressure mentioned above. Another important condition particularly with respect to a moving bed operation is the catalyst to oil ratio, expressed on a weight basis. Generally, a catalyst to oil ratio on the order of about 0.01 to about 20 is used. The hydrogen concentration or partial pressure under reaction conditions determines whether hydrogen is consumed or produced in an operation. Generally, the hydrogen is supplied in either the pure form or as a hydrogen-containing gas stream in which the hydrogen constitutes at least about 30% by volume. On a pure hydrogen basis, about 100 to about 20,000 s. c. f. b., standard cubic feet of hydrogen (measured at 60° F. and 760 mm.) per barrel of oil feed (measured as a 42 gallon barrel) are employed in the reaction. The hydrogen partial pressure corresponding to the above conditions is at least about 50 p. s. i. a., or more usually, about 75 to about 350 p. s. i. a., or higher.

The catalyst can be utilized in processes involving either a fixed or moving bed of the fluid or non-fluid type. In the conventional fixed bed operation a granular or pelleted catalyst is used, and at least two vessels are employed in order that a continuous flow of processing materials is obtained. In the conventional fluid operation, catalyst inventory or hold-up exists in both the regeneration and reaction vessels and the finely divided catalytic material having a size in the order of about 5 to about 250 microns is fluidized by the upward passage of processing materials in the gasiform state. The superficial linear gas velocity of the processing materials flowing in both the reactor and regenerator varies from about 0.1 to about 50 feet per second, or more usually, about 1 to about 6 feet per second. As a result of hydrocarbon conversion, carbonaceous material is deposited on the catalyst which must be removed at some desired level, otherwise the activity of the catalyst declines unduly. This is accomplished by burning the carbonaceous material with an oxygen-containing gas, e. g., air or oxygen, at a temperature of about 600° to about 1200° F., or more usually about 950° to about 1150° F.

The catalyst of the present invention is prepared by mixing molybdenum oxide in a solid form with an alumina-containing substance and then treating the mixture under suitable conditions to derive the finished catalyst product. For the purposes of this specification and the appended claims, it should be understood that an "alumina containing substance" is intended to designate alumina, alumina gel or any other form of material which upon calcination treatment will produce alumina; thus the alumina containing substance may include a hydrous alumina gel, a peptized solution of alumina, dried alumina gel, calcined alumina gel, activated alumina, gamma-alumina, bauxite, hydrated alumina, eta-alumina, etc. In the preparation of the catalyst, molybdenum oxide, e. g., molybdenum trioxide in the solid form, is mixed with an alumina containing substance and if the alumina containing substance contains water, the catalyst mass may or may not be wholly or partially dehydrated prior to being subjected to an elevated temperature at which calcination occurs. In another method of preparing the catalyst, molybdenum oxide can be added to a partially or wholly dried alumina-containing substance and then the catalyst mass is subjected to a calcination treatment, with or without a previous drying operation. A simple and effective method of preparing the catalyst involves mixing the molybdenum oxide in the solid form with alumina which has been previously calcined. The mixture is then subjected directly to a calcination treatment in order to effect the migration or distribution of the molybdenum oxide on the alumina.

When a drying operation is employed in the preparation of the catalyst, it is conducted at a temperature not greater than about 400° F., or more usually, at a temperature of about 200° to about 250° F., and for a period of about 10 to about 60 hours. As a result of the drying operation a part or substantially all of the water is removed by evaporation. After the catalyst mass has been partially or wholly dried, it is then subjected to an elevated temperature at which calcination is effected. In this instance, the elevated temperature employed should be sufficient to cause the molybdenum oxide to diffuse throughout the alumina containing material. For this purpose, a temperature in the order of about 1000° to about 1700° F. is satisfactory to distribute the molybdenum oxide throughout the alumina. While this temperature treatment is not in the exact sense, in some instances, a calcination treatment, nevertheless, it should be understood as such for the purpose of this specification and the appended claims. Normally, the calcination treatment is conducted for a period of about 1 to about 10 hours, preferably about 2 to about 6 hours. For such periods of calcination treatment, it is preferred to employ a temperature in the order of about 1100° to about 1600° F.

The alumina containing substance can be prepared by a variety of methods for use under the present invention. The following are general methods of preparation by which the alumina containing substance can be made. (1) Aluminum metal, water, an acid, e. g., HCl, formic acid, acetic acid, and mercury or mercuric oxide are reacted under suitable conditions and proportions to produce a hydrous alumina or alumina sol. The alumina sol is precipitated or gelled by means of an electrolyte and the resultant gel with or without drying and/or calcination can be admixed with molybdenum oxide in the solid form. (2) The alumina may be derived by reacting an aluminum salt, e. g., aluminum chloride, aluminum nitrate, aluminum sulfate, with ammonium hydroxide to produce alumina gel. The washed alumina gel with or without drying and/or calcination can be admixed with molybdenum oxide in the solid form.

The catalyst employed for the process of this invention contains about 0.5 to about 25%, preferably about 1 to about 10% by weight of molybdenum oxide, based on the total catalyst. The remainder of the catalyst may constitute alumina or, as indicated hereinbelow, there may also be present in the catalyst small amounts of silica. In the case of employing silica, the amount of alumina contained in the catalyst is essentially the difference after taking into account the quantity of molybdena.

The final catalyst can also contain small amounts of silica for the purpose of enhancing the stability of the catalyst at elevated temperatures. The silica can be employed in an amount of about 0.1 to about 10%, or more usually, about 1 to about 5% by weight, based on the total catalyst. The silica, as in the case of the alumina, can be in the form of a gel or a dried and/or calcined material before admixing with the molybdenum oxide and/or alumina containing substance. The precursor material for the silica includes e. g. silicon tetrachloride; the organic orthosilicates, e. g., the alkyl substituted type; etc.

The mode of operation for effecting the distribution of molybdenum oxide on alumina involves the use of various physical forms of the component materials. When the alumina is used in the solid form, it may be lump, granular, finely divided or micro-spherical material. Likewise, the molybdenum oxide can be used in the same physical form as the solid alumina before treatment at an elevated temperature. It is desirable to effect a thorough mixing of the alumina and molybdenum oxide in order that there is a greater tendency for the molybdenum oxide to distribute throughout the alumina material. It was found that an excellent catalyst can be prepared by using a previously calcined alumina in a finely divided state in admixture with finely ground molybdenum oxide and subjecting the mixture to the required elevated calcination temperature. This method has advantages over any of the other techniques described hereinabove on the basis of simplicity and the effective manner by which the molybdenum oxide distributes on the alumina. In another embodiment of this invention, it is contemplated using both alumina and molybdenum oxide in the finely divided form and maintaining the mass fluidized by the passage of an inert gas therethrough while being subjected to the required elevated temperature. By means of the fluidized principle, it is possible to maintain thorough mixing of the alumina and the molybdenum oxide during the calcination treatment, thus avoiding any tendency for a portion of the alumina to be substantially free of molybdenum oxide after the prescribed treatment. The temperature for this fluid system is the same as given hereinabove. To facilitate fluid operation, a spray dried alumina powder can also be used for this purpose.

Another method involves the use of a lower form of molybdenum oxide, e. g., $MoO_2$, $Mo_2O_3$, etc. These lower forms of oxides in the solid form are mixed with the alumina containing substance and calcined at the elevated temperatures described above in the presence of an oxygen containing gas, e. g., air, oxygen, diluted air, etc. in order to transform the lower oxide form of molybdenum to the desired $MoO_3$ and distribute the same over the alumina in a single operation. This may be effected as either a fluid or non-fluid operation.

In order to more fully describe the present invention, specific examples of catalyst preparations are given below.

*Catalyst I*

Alumina containing 5% silica, in a quantity of 880 grams, was impregnated with an ammonium molybdate solution, prepared by dissolving 60.6 grams of molybdenum trioxide in 48.5 cc. of concentrated ammonium hydroxide (28–30% ammonia reagent) and 550 cc. of water. The impregnation of alumina was accomplished at a temperature of 46° C. An additional 10–20 cc. of water were added in order to form a smooth paste. The paste was placed in an Elconap oven and dried for 21 hours at 230° F. The dried material was ground to a powder and weighed 864 grams. The catalyst powder was calcined for 2 hours at 1000° F. Thereafter, the catalyst was pelleted into 3/16" pills and calcined for an additional 3 hours at 1200° F. The final catalyst contained 8.87% of molybdenum trioxide.

*Catalyst II*

The same alumina which was used in Catalyst I above, in a quantity of 866 grams, was mixed with 60.6 grams of molybdenum trioxide. The alumina was in the powdered form whereas the molybdena was ground to a powder before admixture therewith. The mixture of alumina and molybdenum trioxide powders was pelleted into 3/16" pills. Thereafter, the pellets were calcined for 6 hours at 1200° F. The final mass weighed 628 grams and contained 8.85% molybdenum trioxide.

Catalyst III

In order to determine the stability of Catalyst II at elevated temperatures, it was calcined at 1470° F. for a period of 6 hours. The stability of this catalyst towards elevated temperatures is shown by reference to the data given below in Table I.

Samples of the above catalysts were tested in a hydroforming laboratory unit using a fixed bed reactor. The results of these tests were made with a Mid-Continent heavy naphtha having a relatively high end point. This feed stock has the following characteristics:

ASTM distillation:    I. B. P. 228° F.—E. P. 435° F.
° API _____ 51.7
Wt. percent sulfur _____ 0.05
Aniline point _____ 139
Percent aromatics _____ 9

This is a difficult feed stock to hydroform, because of its relatively low naphthenic content and its tendency to form relatively large carbonaceous deposits on a catalyst. The catalysts in suitable quantities were charged to the hydroforming reactor. Heat was applied to the reactor in order to obtain the desired reaction temperature. Nitrogen was passed through the reactor in order to remove any extraneous air which might be held therein. Following the nitrogen purge, hydrogen was circulated through the reactor for about one hour while the desired temperature was attained. During this operation, the temperature at various points in the bed was ascertained with two thermocouples, one located in the upper part and one in the lower part of the bed. After the hydrogen rate had been adjusted to the desired quantity and the temperature was relatively constant at the desired level, naphtha vapor was charged to the reactor at the desired rate.

The results obtained in hydroforming naphtha by the use of various catalysts are reported in Table I.

TABLE I

| Run No. | 1 | 2 | 3 | 4 |
|---|---|---|---|---|
| Catalyst No. | II | I | I | III |
| Operating Conditions: | | | | |
|   Temperature, ° F. | 903 | 900 | 904 | 901 |
|   Pressure, p. s. i. g. | 250 | 250 | 250 | 250 |
|   Space Vel. $W_o$./hr./$W_c$. | 0.98 | 1.00 | 0.46 | 0.50 |
|   Hydrogen, S. C. F. B. | 4,836 | 4,896 | 4,984 | 4,847 |
|   Length of run, Hrs. | 8 | 8 | 8 | 8 |
| Yields (Output Basis): | | | | |
|   Obs. Liquid Product, Vol. Percent. | 92.4 | 89.7 | 81.2 | 86.7 |
|   100% $C_4$ Gasoline,[1] Vol. Percent. | 89.8 | 86.5 | 81.4 | 83.1 |
|   10# RVP Gasoline, Vol. Percent. | 94.2 | 89.1 | 79.8 | 84.3 |
|   Excess Butanes, Vol. Percent. | −4.4 | −2.6 | +1.6 | −1.2 |
|   Polymers, Vol. Percent. | 2.9 | 3.9 | 3.3 | 4.1 |
|   Carbon, Wt. Percent. | 0.263 | 0.710 | 0.763 | 0.574 |
|   Dry Gas, Wt. Percent. | 7.0 | 9.5 | 14.0 | 11.4 |
|   Total Butanes, Vol. Percent. | 4.4 | 6.1 | 8.9 | 6.8 |
|   Hydrogen, S. C. F. B. | 470 | 426 | 732 | 668 |
|   Feed Cracked, Vol. Percent. | 33.5 | 42.6 | 55.5 | 47.7 |
| Inspections: | | | | |
|   10# RVP Gasoline, Octane No. CFRR. | 79.9 | 82.2 | 94.9 | 92.3 |
|   Yield of 10# RVP Gasoline at 85 CFRR Octane No. | 94.1 | 92.4 | 92.4 | 94.3 |

[1] Gasoline of 400° E. P.

From Table I, above, it is observed that the catalyst prepared in accordance with the present invention, Catalyst II, gave a substantially higher liquid yield and significantly lower carbon and dry gas yields than the catalyst prepared by a known conventional technique, Catalyst I. Furthermore, the catalyst of this invention, Catalyst II, after having been subjected to an elevated temperature, namely, 1470° F., for a period of 6 hours had retained its selectivity substantially, as is evident from the results obtained from Catalyst III. Hence, it is to be noted that the present invention affords a method of preparing a new catalyst which is superior with respect to selectivity over catalysts obtained by known methods of preparation.

Having thus provided a description of my invention by furnishing specific examples thereof, it should be understood that no undue limitations or restrictions are to be imposed by reason thereof, but that the scope of this invention is defined by the appended claims.

I claim:

1. A method of preparing a catalyst which comprises passing an oxygen containing gas upwardly through a mass of finely divided solid material comprising a mixture of an oxide of molybdenum of lower form than molybdenum trioxide and an alumina containing material at a velocity sufficient to form a dense fluidized mass, at a temperature of about 1000° to about 1700° F. and for a period sufficient to oxidize the lower form oxide to molybdenum trioxide and distribute the molybdenum trioxide on the alumina material.

2. The process of claim 1 wherein the oxygen containing gas is air.

3. The process of claim 1 wherein the oxygen containing gas is oxygen.

4. A method of preparing a catalyst which comprises passing an oxygen containing gas upwardly through a mass of finely divided solid material comprising a mixture of an oxide of molybdenum of lower form than molybdenum trioxide and alumina gel at a velocity sufficient to form a dense fluidized mass, at a temperature of about 1100° to about 1600° F. and for a period sufficient to oxidize the lower form oxide to molybdenum trioxide and distribute the molybdenum trioxide on the alumina gel.

5. The process of claim 4 wherein the lower form oxide of molybdenum is $MoO_2$.

6. The process of claim 4 wherein the lower form oxide of molybdenum is $Mo_2O_3$.

References Cited in the file of this patent

UNITED STATES PATENTS

| 2,355,831 | Voorhees | Aug. 15, 1944 |
|---|---|---|
| 2,499,255 | Parker | Feb. 28, 1950 |
| 2,533,071 | Vesterdol et al. | Dec. 5, 1950 |
| 2,692,847 | Rex | Oct. 26, 1954 |